United States Patent
Lindsay et al.

(10) Patent No.: US 6,253,197 B1
(45) Date of Patent: Jun. 26, 2001

(54) SYSTEM AND METHOD FOR HASH LOOPS JOIN OF DATA USING OUTER JOIN AND EARLY-OUT JOIN

(75) Inventors: Bruce Gilbert Lindsay; Eugene Jon Shekita, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/167,395

(22) Filed: Oct. 6, 1998

(51) Int. Cl.⁷ ....................................................... G06F 17/30
(52) U.S. Cl. .................................. 707/3; 707/10; 707/202
(58) Field of Search ........................... 707/1, 2, 3, 4, 707/10, 202

(56) References Cited

U.S. PATENT DOCUMENTS

| | | | |
|---|---|---|---|
| 4,497,039 | | 1/1985 | Kitakami et al. ...................... 364/900 |
| 5,121,494 | | 6/1992 | Dias et al. ............................. 395/600 |
| 5,197,002 | * | 3/1993 | Spencer ................................. 364/406 |
| 5,241,648 | | 8/1993 | Cheng et al. .......................... 396/600 |
| 5,345,585 | | 9/1994 | Iyer et al. .............................. 395/600 |
| 5,537,589 | | 7/1996 | Dalal ..................................... 395/600 |
| 5,548,754 | * | 8/1996 | Pirahesh et al. .......................... 707/2 |
| 5,557,791 | * | 9/1996 | Cheng et al. ............................. 707/2 |
| 5,619,713 | * | 4/1997 | Baum et al. ........................... 707/102 |
| 5,666,525 | | 9/1997 | Ross ...................................... 395/602 |
| 5,706,495 | * | 1/1998 | Chadha et al. ............................ 707/2 |
| 5,802,357 | | 9/1998 | Li et al. ................................. 395/602 |
| 5,864,840 | * | 1/1999 | Leung et al. .............................. 707/2 |
| 5,873,074 | * | 2/1999 | Kashyap et al. .......................... 707/2 |
| 5,960,428 | * | 9/1999 | Lindsay et al. ........................... 707/4 |
| 5,963,933 | * | 10/1999 | Cheng et al. ............................. 707/2 |
| 5,978,793 | * | 2/1999 | Kashyap et al. .......................... 707/2 |
| 6,055,538 | * | 4/2000 | Kessenich et al. .................... 707/101 |
| 6,122,644 | * | 7/1998 | Graefe et al. ......................... 707/202 |
| 6,134,546 | * | 6/1998 | Bestgen et al. ........................... 707/4 |

OTHER PUBLICATIONS

Publication: "The Effect of Bucket Size Tuning in the Dynamic Hybrid Grace Hash Join Method." Kitsuregawa et al. Proceedings of the Fifteenth International Conference on Very Large Data Bases. Amsterdam, 1989.

Book: "Computers and Intractability, A Guide to the Theory of NP–Completeness." Garey et al. pp. 121–148. 1979.

Book: "Integer and Combinational Optimization." Nemhauser et al. pp. 433–456. Wiley Interscience Series in Discrete Mathematics and Optimization. 1998.

Publication: "A Hash Join Technique for Relational Database Systems." Yasuo Yamane. pp. 515–528. Undated.

Publication: "Query Optimization in Database Systems." Jarke et al. pp. 111–152. Computing Surveys, vol. 16, No. 2, Jun. 1984.

(List continued on next page.)

Primary Examiner—Hosain T. Alam
Assistant Examiner—Anh Ly
(74) Attorney, Agent, or Firm—John L. Rogitz (57) ABSTRACT

A system and method for joining a build table to a probe table in response to a query for data includes executing a hash loops join of the build table and the probe table. Matched rows are joined and output when the rows match each other by satisfying a join predicate. In an outer join, unmatched rows in the probe table are joined to a NULL build table field values and output, such that all rows of the probe table are output regardless of whether they have matched rows in the build table. In an early-out join, on the other hand, a "match once" table defines the probe table and in response to a query for unique probe table outputs, the joining of a probe table row, once joined and output a first time, to any other rows in the other table is prevented regardless of whether the row might match other rows. In both the hash loops early-out join and the hash loops outer join, when the build table is larger than main memory, the roles of the build and probe tables are reversed.

24 Claims, 4 Drawing Sheets

OTHER PUBLICATIONS

Publication: "An Adaptive Hash Join Algorithm for Multiuser Environments." Zeller et al. pp. 186–197. Proceedings of the 16th VLDB Conference. Brisbane, Australia, 1990.

Publication: "Sort–Merge–Join: An Idea Whose Time Has(h) Passed?" Graefe. pp. 406–417. IEEE 1063–6382. 1994.

Publication: "Tradeoffs in Processing Complex Join Queries via Hasing in Multiprocessor Database Machines." Schneider et al. pp. 469–480. Proceedings of the 16th VLDB Conference. Brisbane, Australia, 1990.

Publication: "Hashing Methods and Relational Algebra Operations." Bratbergsengen. pp. 323–333. Proceedings of the Tenth International Conference on Very Large Data Bases. Singapore, Aug., 1984.

Publication: "Practical Skew Handling in Parallel Joins." DeWitt et al. pp. 27–40. Proceedings of the 18th VLDB Conference. Vancouver, British Columbia, Canada, 1992.

Publication: "Implementation Techniques for Main Memory Database Systems." DeWitt et al. pp. 1–8. ACM 0–89791–128–8/84/006/0001. 1984.

Publication: "Hash–Partitioned Join Method Using Dynamic Destaging Strategy." Nakayama et al. pp. 468–478. Proceedings of the 14th VLDB Conference. Los Angeles, CA. 1988.

Publication: "Multiprocessor Hash–Based Join Algorithms." DeWitt et al. pp. 151–164. Proceedings of the VLDB Conference. Stockholm. 1985.

* cited by examiner

DEPARTMENT TABLE 38

| DEPT. DNO (DEPT. NO.) 40 | DEPT. NAME (DEPT. NAME) 42 | DEPT. BUDGET (DEPT. BUDGET) 44 |
|---|---|---|
| 01 | PERSONNEL | $XX |
| 02 | OPERATIONS | $YY |
| ⋮ | ⋮ | ⋮ |
| N | ADMINISTRATION | $ZZ |

Fig. 3

EMPLOYEE TABLE 46

| EMP. DNO (EMPLOYEE'S DEPT. NO.) 48 | EMP. NAME (EMPLOYEE'S NAME) 50 | EMP. SAL (EMPLOYEE'S SALARY) 52 |
|---|---|---|
| 01 | SMITH | $AA |
| 02 | JONES | $BB |
| ⋮ | ⋮ | ⋮ |
| 01 | EMPLOYEE M | $MM |
| NULL | BROWN | $BB |

Fig. 4

| DEPT. NAME 56 | EMP. NAME 54 | SALARY 60 |
|---|---|---|
| PERSONNEL | SMITH | $AA |
| PERSONNEL | M | $MM |
| OPERATIONS | JONES | $BB |
| 58 — NULL | BROWN | $XX |

Fig. 5

| DEPT. NAME 62 |
|---|
| PERSONNEL |
| OPERATIONS |

Fig. 6
OUTER JOIN

Fig. 7
EARLY-OUT JOIN

US 6,253,197 B1

SYSTEM AND METHOD FOR HASH LOOPS JOIN OF DATA USING OUTER JOIN AND EARLY-OUT JOIN

BACKGROUND OF THE INVENTION

1. Field of the Invention

The present invention relates generally to computer database systems, and more particularly to systems and methods for executing multi-table joins in response to a query to a computer database for information.

2. Description of the Related Art

When a user requests data from a database by submitting a query to the database, it is often necessary that the database management system (dbms) that is associated with the database combine, i.e., join, data from two or more tables that contain data. For example, it might be desired to know the names and salaries of employees in a company, by department. Using the database query language known as "SQL", two tables could be created as follows:

"create table DEPT (DNO, NAME, BUDGET)", where DNO is an integer representing the department number, NAME is a variable character alpha-numeric name of the department, and BUDGET is a floating point variable representing the department's budget; and "create table EMP (DNO integer, NAME varchar, SALARY float)", where DNO is an individual employee's department number, NAME is the employee's name, and SALARY is the employee's salary.

Thus, in the above example, the relevant data is arranged in a "department" table and in an "employee" table. In the "department" table, each row has the above-listed three department entries, and in the "employee" table, each row has entries corresponding to a particular employee's department number, name, and salary. To return the employee names, individual salaries, and department names requires joining at least one column from the "department" table with at least one column from the "employee" table.

In the particular example discussed above, the department number entry from the "department" table is commonly referred to as a key (it defines a department), whereas the individual employees' department numbers are referred to as foreign keys (they define the respective departments in which the employees work). The columns DEPT.DNO and EMP.DNO establish a join key, and a row in the "department" table is joined to a row in the "employee" table only if the rows match a query-defined join predicate that in turn essentially defines the join key, that is, only if DEPT.DNO= EMP.DNO for that row. The above-described join can be undertaken to associate employees by department using the following join query syntax:

select DEPT.NAME // department name
   EMP.NAME // employee name
   EMP.SALARY // employee salary
from DEPT, EMP // the two tables discussed above
where DEPT.DNO=EMP.DNO//such that the employee department number equals a department number in the "department" table The result of the above join is a third table in which employee names and salaries have been associated with department names by joining a row in the department table with a corresponding row in the employee table.

A method known to those skilled in the art for effecting the above-described join is referred to as "hash loops join". Using a hash loops join, one of the of two tables to be joined is designated a build table, and the other table is designated a probe table. Either table can be a base table, i.e., a table stored in the database, or a derived table, i.e., a table that is the result of a previous, intermediate join, or other query operations. In any case, if the entire build table can be stored in the main memory of the dbms computer, it is written into main memory. Each row is entered into a hash table on a hash of the join columns. The probe table is then hashed on its join columns and checked against the build table for matches on the join key. The hash is undertaken on the join key by mathematically operating on the value of the join columns at each of the rows of the build/probe table in accordance with a hash function to yield respective hash values.

Sometimes, however, the entire build table is too large to be written into the main memory of the dbms computer. Under these circumstances, as much of the build table that can fit into main memory is written into memory and hashed. The probe table is processed against the chunk of the build table in memory. After processing the chunk of the build table in memory, the next build table chunk is written into memory, hashed, and the probe table rows are again checked against the build table rows as summarized above, and so on until the entire build table has been processed and the probe phase completed. When the probe phase is complete, the table join has been executed in response to the query.

As recognized by the present invention, however, it is sometimes possible that, while not all rows in the probe table have a corresponding build table match and, thus, will not be output as part of the join, it might nevertheless be desirable to output the unmatched probe table rows. For example, if one or more employees in the employee table happen to be unassigned to a department, it might nevertheless be desired to output their names and salaries with an "unassigned" department name for completeness of a salary report. This operation of preserving rows of a table that do not join to or match rows in the other table is known as a left (or right) outer join. Hash loops join as described above does not support left (or right) outer join, particularly when the build table does not fit in memory in its entirety.

Moreover, the present invention recognizes that for some queries, it is not necessary to output a complete list of all matching table rows. Consequently, processing and outputting all matches under such circumstances unnecessarily prolongs query processing. As an example, suppose it is desired to know just the names of departments that have one or more employees. In this case, the name of each department having one or more employees need be joined and output only once. This operation, known as early-out join, is usefull in many circumstances to improve the efficiency of query processing, see U.S. Pat. No. 5,548,754, incorporated herein by reference. Unfortunately, conventional hash loops join does not support early-out query processing when the build table is too large for memory. The present invention, however, understands that it is possible to use hash loops join in combination with an early-out join and/or a left (or right) outer join.

SUMMARY OF THE INVENTION

A computer-implemented method is disclosed for integrating at least one of: an early-out table join defining a "match once" table, and a left or right outer table join defining a "preserved" table, in a hash loops procedure when the size of a build table of the hash loops procedure exceeds the main memory size. In accordance with the present invention, a probe table of the hash loops procedure is established by the "match once" table or the "preserved" table. The method includes reversing the roles of the build table and probe table when the size of the build table exceeds the main memory size, and flagging rows of the probe table that match rows of the build table. In a left or right outer join in which the probe table is established by the "preserved" table, rows of the probe table that are not flagged after the probe phase are joined to one or more fields having NULL values and output. In contrast, in the early-out join in which the probe table is established by the "match once" table, rows of the probe table that are joined to respective rows of the build table are flagged "ignore" on a first match, such that rows already flagged "ignore" are not joined to any more build table rows.

In another aspect, the invention is a general purpose computer system programmed according to the inventive steps herein to efficiently join a build table to a probe table in response to a user query for data using a hash loops left or right outer join and/or a hash loops early-out join. A left or right outer join involves outputting all rows of a table referred to as a "preserved" table, and in the present invention the "preserved" table always establishes the probe table of a hash loops join. Similarly, an early-out join involves outputting matching rows of a "match once" table once only, regardless of how many matches the rows actually satisfy, and in the present invention the "match once" table always establishes the probe table of a hash loops join.

The invention can also be embodied as an article of manufacture—a machine component—that is used by a digital processing apparatus and that tangibly embodies a program of instructions that are executable by the digital processing apparatus to establish a hash loops outer join. This invention is realized in a critical machine component that causes a digital processing apparatus to perform the inventive method steps herein.

As disclosed in detail below, the computer system includes at least one computer having at least one main memory defining a memory size. The computer also has at least one data storage disk. One or more input devices are associated with the computer for generating a user query for data stored in the probe table and the build table. Moreover, the computer includes logic means for writing at least portions of a first one of the tables into the main memory, and logic means for constructing a hash on join columns of rows of the first table. Logic means then read a second one of the tables and search the hash for matches with join column rows of the first table when processing a left or right outer join. When processing a left or right outer join, all rows in the probe table are then output at least once regardless of whether the row matches a row in the build table.

As intended herein, a query defines a join predicate between the tables, and the means for outputting includes match means for joining a row in the second table with a row in the first table according to the join predicate to establish a joined row. The joined row is output when the rows match each other by satisfying the join predicate. Also, null means join an unmatched row in the probe table with a set of NULL valued fields (fields whose value is null) when the row from the probe table does not match any row in the build table.

In another aspect, a computer-implemented method includes executing a hash loops join of a build table and a probe table, and outputting at least portions of at least one matched row in the probe table with at least portions of at least one corresponding row in the build table when the rows match each other by satisfying a join predicate. The method further includes outputting unmatched rows in the probe table. A computer program product embodying instructions readable by a digital processing apparatus for carrying out the method steps is also disclosed.

In another embodiment, a computer system includes at least one computer having at least one main memory defining a main memory size. The computer also has at least one data storage disk. One or more input devices are associated with the computer for generating a user query for data stored in at least a probe table and a build table. These tables are accessible by the computer. Moreover, the computer includes logic means for writing at least portions of a first one of the tables into the main memory, as well as logic means for constructing a hash on rows of the first table. Logic means are provided for reading a second one of the tables and searching the hash for matches with rows of the first table. Furthermore, logic means join a match row in the probe table to a row in the build table when the rows match by satisfying a join predicate. Importantly, the probe table's row is not joined to any other rows in the build table regardless of whether the probe table's row matches any other rows in the build table. Only one matched row per probe table row is output.

Preferably, the probe table is established by a "match once" table of an early-out join. Also, the joining means includes match means for joining a row in the probe table with a row in the build table to establish a joined row.

In another aspect of the early-out join embodiment, a computer-implemented method includes executing a hash loops join of a build table and a probe table. Also, the method includes outputting at least portions of at least one match row in the probe table with at least portions of at most one corresponding row in the build table when the rows match each other. Furthermore, as disclosed below the joining of the match row of the probe table to any other rows in the build table is prevented, regardless of whether the match row of the probe table matches other rows in the build table. A computer program product embodying instructions readable by a digital processing apparatus for carrying out the method steps is also disclosed.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

As summarized above, it is the purpose of the present invention to integrate a hash loops join with both left/right outer joins and early-out joins. As referred to in the art, a left or right outer join involves outputting all rows of a table referred to as a "preserved" table. It is to be understood that in the present invention the "preserved" table of a left or right outer join always establishes the probe table of a hash loops join. Similarly, an early-out join involves outputting matching rows of a "match once" table at most one time only, regardless of how many matches the rows actually satisfy, and in the present invention the "match once" table of an early-out join always establishes the probe table of a hash loops join.

Figure 1:
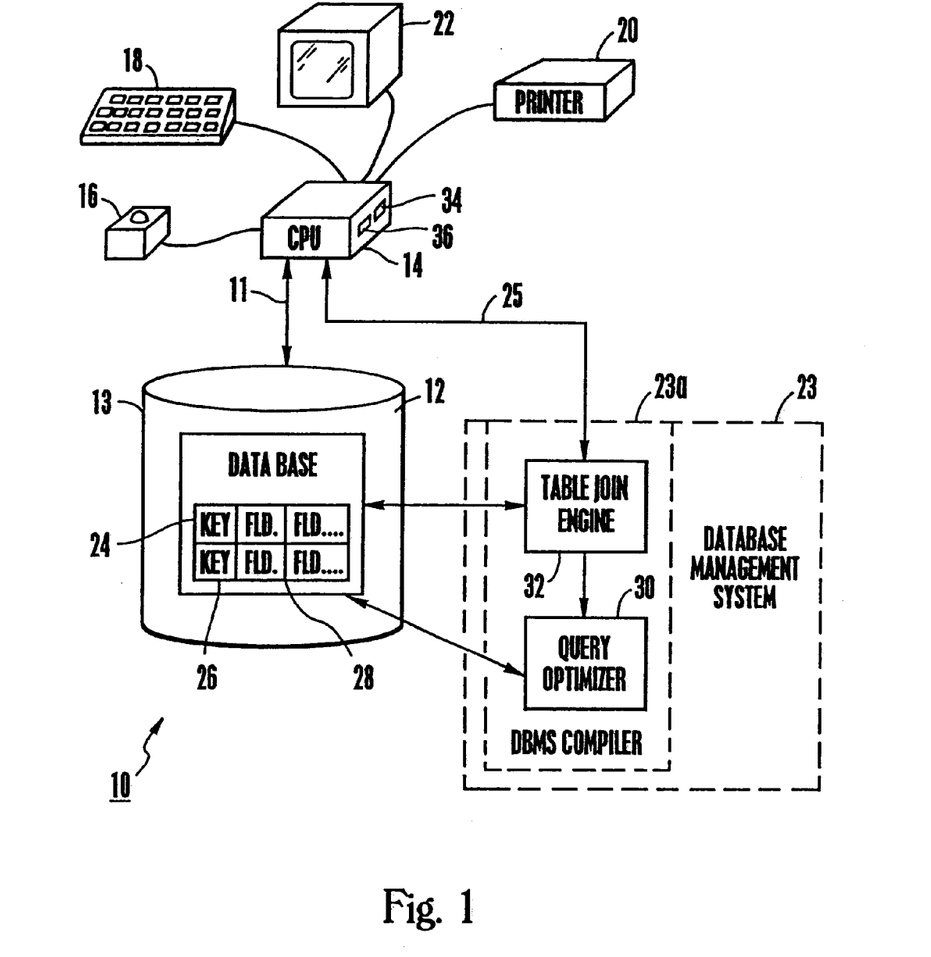
FIG. 1 is a schematic diagram of the present system for efficiently joining database tables.

Referring initially to FIG. 1, a system is shown, generally designated 10, for accessing, via a path 11, data elements from a database 12 for responding to a database query by joining two or more tables composed of data elements. The data elements may reside, for example, in one or more storage devices such as the device 13. More specifically, the data elements can reside in a single storage, or the data elements can be distributed across many storages in a parallel processing system.

In the particular architecture shown, the system 10 includes a digital processing apparatus, such as a computer 14. In one intended embodiment, the computer 14 may be a personal computer made by International Business Machines Corporation (IBM) of Armonk, N.Y., or the computer 14 may be any computer, including computers sold under trademarks such as AS400, with accompanying IBM Network Stations. Or, the computer 14 may be a Unix computer, or OS/2 server, or Windows NT server, or IBM RS/6000 250 workstation or an IBM laptop computer.

As shown in FIG. 1, the computer 14 is electrically connected to one or more input devices, e.g., a mouse 16 and a keyboard 18, which can be manipulated by a user of the system 10 to generate requests for data that explicitly or implicitly define a request for data from plural data tables, for example, the tables shown in FIGS. 2 and 3 and discussed further below. The results of the table join can be output via an output device such as a printer 20 or monitor 22 that are conventionally coupled to the computer 14.

In one implementation of the present invention, a database management system (dbms) 23 of the compiling kind executes in the computer 14, receiving, among other things, user requests that contain database queries. The dbms 23 processes the queries, providing access to the database 12. The dbms 23 includes a compiler 23a, which may also be referred to as a "bind" component.

FIG. 1 shows that the storage device containing the database 12 electronically stores a plurality of data records 24, commonly referred to as tuples. Each data record 24 can include a key 26 and a plurality of field elements 28, commonly referred to as attributes. For example, each data record 24 may contain personnel information, with the fields 28 containing values for attributes of the person such as department number, salary, and so on. The data elements can be stored as tables, or they can be otherwise stored and then arranged in build and probe tables, as discussed further below, just prior to executing the present logic.

As disclosed previously, the present system and method for undertaking table joins has many applications. In but one illustrative use of the present invention, the user might want to retrieve information from the database 12 by generating a query, and to do so the user manipulates the mouse 16 or keyboard 18 as appropriate. Typically, a query is executed in the context of an application program containing database queries. Prior to execution of the application program, it is compiled. During compilation, the queries in the application program are removed and replaced with calls to routines which are bound to the application program. These routines are optimized machine language procedures produced by compilation of the application program queries by the dbms compiler 23a.

During compilation, the computer 14 receives the application program and forwards the query statements over an information path 25 to a query optimizer 30 that is included in the compiler 23a for determining how to efficiently retrieve the requested data As but one example, the query optimizer can be one of the optimizers discussed by Jarke et al. in "Query Optimization in Database Systems", 16 *ACM Computing Surveys* 2 (June 1984).

As intended by the present invention, the dbms compiler 23a includes a table join engine 32 coupled to the query optimizer 30. It is to be understood that the components such as the query optimizer 30 and table join engine 32 can be included in dbms compiler software contained in an appropriate electronic data storage that includes, e.g., a hard disk drive 34 and optical disk drive 36 conventionally coupled to the computer 14.

In accordance with the method described below, the query optimizer 30 uses the table join engine 32 to undertake outer join hash loops joins and early-out join hash loops joins by arranging, when necessary, the storage of the partitions between a main memory of the computer 14 and disk memory of the computer 14, to optimize the table join.

The flow charts herein illustrate the logic structure of the table join engine of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the table join engine 32 may be a computer program that is executed by a processor within the computer 14 as a series of computer-executable instructions. In addition to the drives 34, 36, these instructions may reside, for example, in RAM of the computer 14, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

Figure 2:
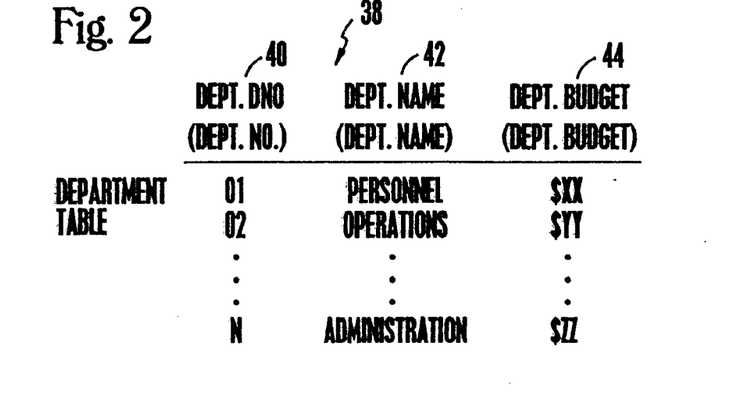
FIG. 2 is a schematic diagram of an exemplary build table.
Figure 3:
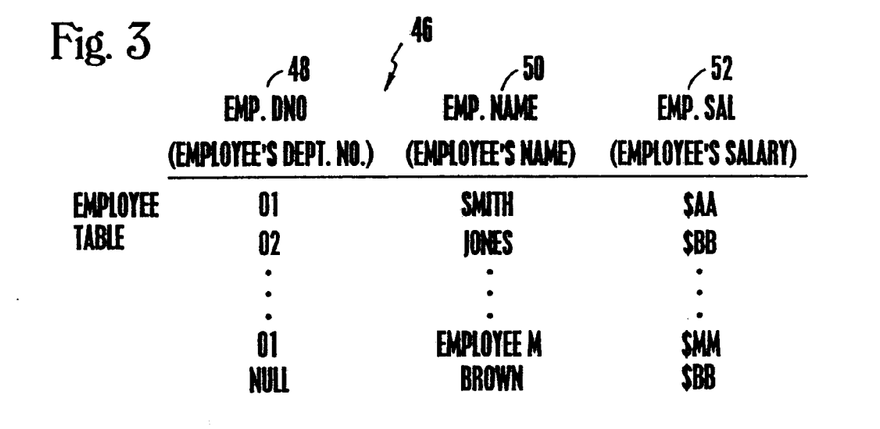
FIG. 3 is a schematic diagram of an exemplary probe table.

FIGS. 2 and 3 show examples of two tables that are sought to be joined in response to a query. Specifically, FIG. 2 shows a department table having a department number column 40 that contains numeric department designations, a department name column 42 that contains alpha-numeric strings representing department names, and a department budget column 44 that contains character strings representing department budgets. It is to be understood that entries in a single row in the department table 38 are correlated to each other.

In contrast, FIG. 3 shows an employee table 46 having an employee department number column 48 that contains numeric department designations of departments in which employees work. Also, the employee table 46 has an employee name column 50 that contains alpha-numeric strings representing names of individual employees, and an employee salary column 52 that contains character strings representing employee salaries. It is to be understood that entries in a single row in the employee table 46 are correlated to each other. Some employees, e.g., "Brown", have not been assigned to a department. Accordingly, the entry in Brown's "Department" column is "NULL".

For illustration purposes, assume that a user inputs a query by means of one or more of the input devices 16, 18 shown in FIG. 1 for a listing of all employees names, along with their salaries and the names of their departments. To respond to the query, the department table 38 must be joined with the employee table 46. It is one purpose of the present invention to undertake this join to output a list of all employees, including those not assigned to a department. As intended herein, the table containing the elements sought to be output regardless of whether they match rows in the other table (the "preserved" table) is designated the probe table and the other table is designated the build table, regardless of the relative size of the tables. Thus, in the example discussed above and shown in FIGS. 2, 3, and 4, the EMP table is the probe table and the DEPT table is the build table.

Figure 4:
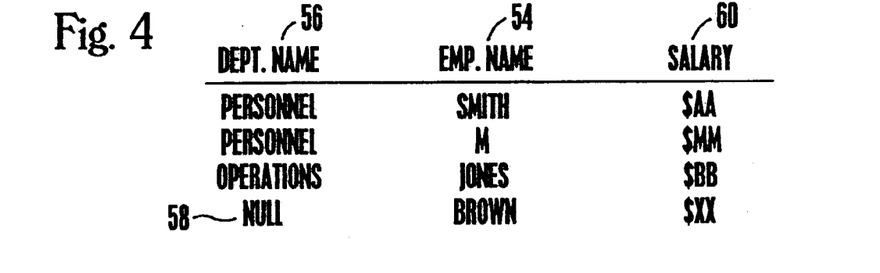
FIG. 4 is a schematic diagram of the results of an outer join of the build and probe tables.

FIG. 4 shows a desired output, listing all employees in a name column 54 by department name in a department name column 56 where possible and otherwise listing unassigned employees with department names set to "NULL" as shown at 58, in an outer join. A salary column 60 is also provided in the output. One preferred query syntax provided for such an outer join is as follows:

select DEPT.NAME // department name
    EMP.NAME // employee name
    EMP.SALARY // employee salary
from EMP left outer join DEPT // the two tables discussed above
where DEPT.DNO=EMP.DNO // such that the employee department number, if one exists, equals a department number in the "department" table, otherwise outputting the names of unassigned employees with the department name field set to "NULL".

As another illustration, assume that a user inputs a query by means of one or more of the input devices 16, 18 shown in FIG. 1 for a listing of all departments having one or more employees. To respond to the query, the department table 38 must be joined with the employee table 46, but as recognized herein, such a join, given the query, need not consider each potential table match. Accordingly, it is one purpose of the present invention to undertake this join to output a list of departments in an efficient manner. As intended herein, the table containing the elements sought to be matched only once (the "match once" table) is designated the probe table and the other table is designated the build table, regardless of the relative size of the tables. Thus, in the example discussed above and shown in FIGS. 2, 3, and 5, the DEPT table is the probe table and the END table is the build table.

Figure 5:
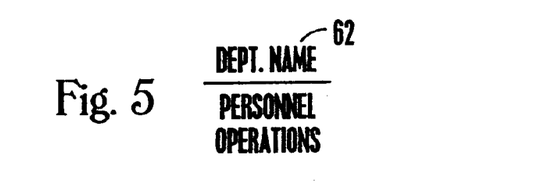
FIG. 5 is a schematic diagram of the results of an early-out join of the build and probe tables.

FIG. 5 shows a desired output, listing all departments in a department column 62 that have one or more employees, but listing each department only once, which is all that is required to satisfy the hypothetical query above. One possible query expressing this desired result follows:

select DEPT.NAME
from DEPT
where exists (select 1 from EMP where DEPT.DNO= EMP.DNO)

The above query can be executed by the query optimizer 30 as an early-out join between the EMP and DEPT tables, with the DEPT table being the "match once" table and, hence, the probe table. The outer join logic invoked by the first of the above queries is shown in FIG. 6, discussed further below, whereas the early-out join logic invoked by the second of the above queries is shown in FIG. 7, discussed further below.

Figure 6:
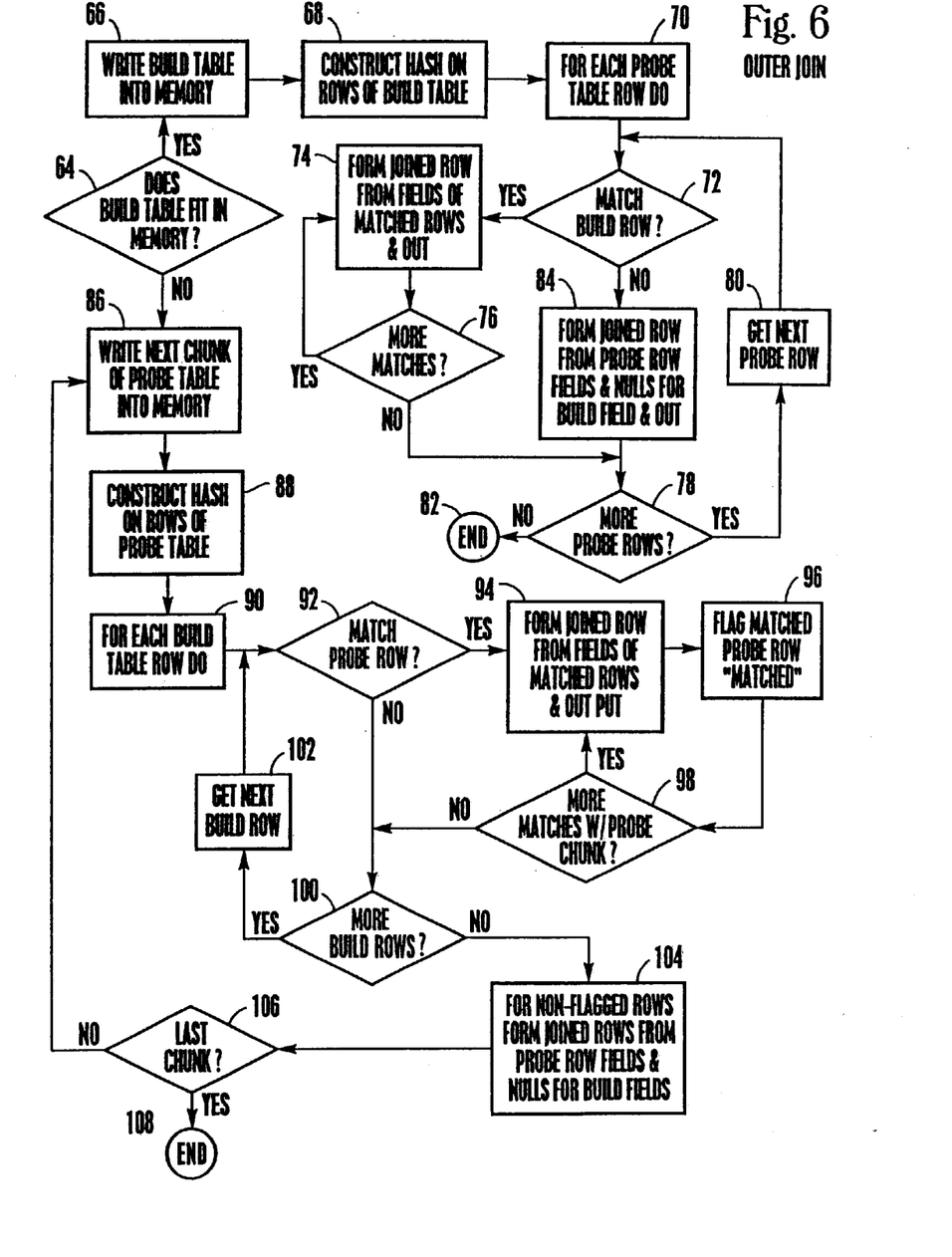
FIG. 6 is a flow chart of the outer join logic.
Figure 7:
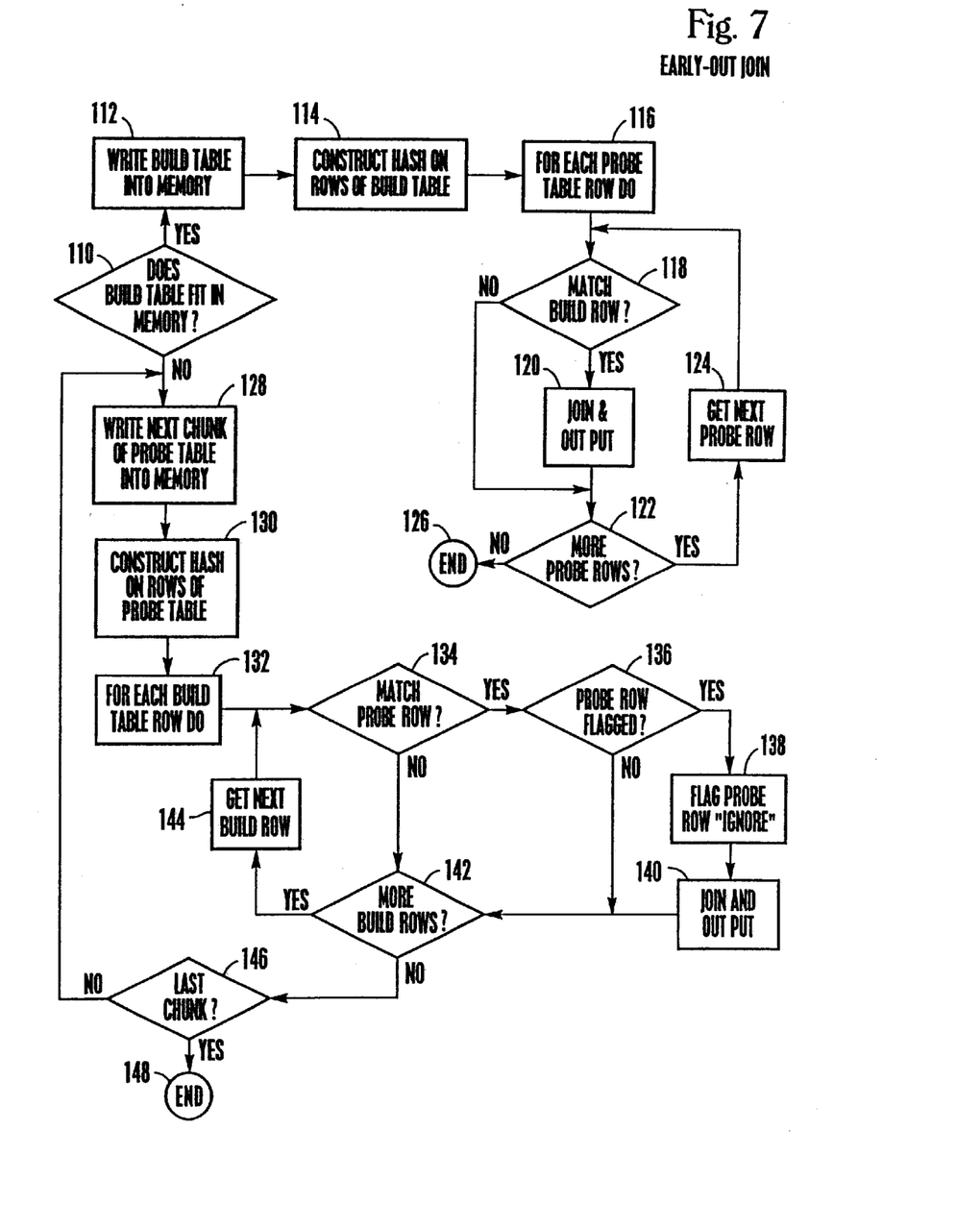
FIG. 7 is a flow chart of the early-out join logic.

Now referring to FIG. 6, the logic of the outer join using hash loops is shown. Commencing at decision diamond 64, it is determined whether the build table can fit in its entirety in the main memory. If it can, the logic moves to block 66 to write the build table into main memory, and then to construct a hash on the join columns of the rows of the build table at block 68 in accordance with hash loops join principles.

Moving to block 70, for each row in the probe table a DO loop is entered in which a hash of the join columns of the probe table row under test is compared to the hash in main memory and searched for matches, with a decision as to whether any matches exist being undertaken at decision diamond 72. If a match exists, the process moves to block 74 to form a joined row from the fields of the probe row under test and the matching build table row, and the joined row is output. Proceeding to decision diamond 76, it is determined for the probe table row under test whether any additional matches exist with build table rows. If so, the process loops back to block 74 to join matching rows and output them; otherwise, the process moves to decision diamond 78. At decision diamond 78, it is determined whether more untested probe table rows exist, and if so, the logic moves to block 80 to retrieve the next probe table row. Otherwise, the logic ends at state 82.

Recall that at decision diamond 72 an initial determination was made whether the probe table row under test matched any build table row. If no match is found, the logic moves to block 84. In accordance with present principles, at block 84 a joined row is formed from probe row fields with null values being inserted in the fields of the joined row that otherwise would be filled with build table field values. The joined row with null values is then output. From block 84 the logic moves to decision diamond 78 and proceeds as described. Thus, non-matched probe table rows are output even though no build table match for them exists, as shown in the example of FIG. 4 at entry 58.

If, on the other hand, it is determined at decision diamond 64 that the build table does not fit in its entirety in the main memory, the logic moves to block 86, wherein the next available chunk of the probe table is written into main memory. Thus, at block 86 the build table and probe table roles are reversed, vis-a-vis a conventional hash loops join. Moving to block 88, a hash is constructed on the join columns of the rows of the probe table that have been written to main memory at block 86.

Proceeding to block 90, for each row of the build table a DO loop is entered in which a hash of the build table row under test is compared to the hash in main memory and searched for matches, with a decision as to whether any matches exist being undertaken at decision diamond 92. If a match exists, the process moves to block 94 to form a joined row from the fields of the probe row that matches the build row under test, and the joined row is output.

According to the present invention, the logic next moves from block 94 to block 96, wherein the probe row that was found to have matched the build table row under test at block 94 is flagged "match". From block 96, the logic moves to decision diamond 98, wherein it is determined for the build table row under test whether any additional matches exist with probe table rows in main memory. If so, the process loops back to block 94 to join matching rows and output them, and thence to block 96 to flag matched probe table rows; otherwise, the process moves from decision diamond 98 to decision diamond 100. Also, the logic flows to decision diamond 100 from decision diamond 92 when no match is found at decision diamond 92.

At decision diamond 100, the logic determines whether more untested build rows remain, and if so, the logic proceeds to block 102 to get the next build table row, and then to loop back to decision diamond 92. If all build rows have been checked against the probe table chunk in memory, however, the logic moves to block 104. At block 104, for all non-flagged probe table rows in memory, joined rows are formed from the probe table row fields with null values being inserted in the fields of the joined row that otherwise would be filled with build table field values. The joined rows with null values are then output.

Proceeding to decision diamond 106 it is determined whether the last probe table chunk has been processed, and if not, the logic loops back to block 86 to write the next probe table chunk into main memory. Otherwise, the process ends at state 108.

Now referring to FIG. 7, the logic of the early-out join using hash loops is shown. Commencing at decision diamond 110, it is determined whether the build table can fit in its entirety in the main memory. If it can, the logic moves to block 112 to write the build table into main memory, and then to construct a hash on the join columns of the rows of the build table at block 114 in accordance with hash loops join principles.

Moving to block 116, a DO loop is entered for each probe table row in which a hash of the join columns of the probe table row under test is compared to the hash in main memory and searched for matches, with a decision as to whether any matches exist being undertaken at decision diamond 118. If a match exists, the process moves to block 120 to form a joined row from the fields of the probe row under test and the matching build table row, and the joined row is output. Proceeding to decision diamond 122 from block 120 or from decision diamond 118 when the test there is negative, it is determined whether more untested probe table rows exist, and if so, the logic moves to block 124 to retrieve the next probe table row. Otherwise, the logic ends at state 126. Thus, when a probe table row has been joined once it cannot be joined again, because the logic prevents it by proceeding directly to decision diamond 122 from block 120, thereby preventing relooping back to block 120 for any one probe table row.

If, on the other hand, it is determined at decision diamond 110 that the build table does not fit in its entirety in the main memory, the logic moves to block 128, wherein the next available chunk of the probe table is written into main memory. Thus, at block 128 the build table and probe table roles are reversed, vis-a-vis a conventional hash loops join. Moving to block 130, a hash is constructed on the rows of the probe table that have been written to main memory at block 128.

Proceeding to block 132, for each row of the build table a DO loop is entered in which a hash of the build table row under test is compared to the hash in main memory and searched for matches, with a decision as to whether any matches exist being undertaken at decision diamond 134. If a match exists, the process moves to decision diamond 136 to determine whether the respective probe row is flagged "ignore". If the probe table row has not been flagged "ignore", the process moves to block 138 to flag the matching probe row "ignore", and then the logic forms a joined row from the fields of the probe row and build row under test at block 140, outputting the joined row.

According to the present invention, if no match exists at decision diamond 134, or if a match exists and the matching probe table row is found to have been flagged "ignore" at decision diamond 136, or from block 140, the logic moves to decision diamond 142. At decision diamond 142, it is determined whether more untested build rows remain, and if so, the logic proceeds to block 144 to get the next build table row, and then to loop back to decision diamond 134. If all build rows have been checked against the probe table chunk in memory, however, the logic moves to decision diamond 146 to determine whether the last probe table chunk has been processed. If not, the logic loops back to block 128 to write the next probe table chunk into main memory. Otherwise, the process ends at state 148. It will again be appreciated that in the hash loops join process shown at blocks 128–148, when a probe table row has been joined once it cannot be joined again.

While the particular SYSTEM AND METHOD FOR HASH LOOPS JOIN OF DATA USING OUTER JOIN AND EARLY-OUT JOIN as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer-implemented method for integrating at least one of: an early-out table join, and a left or right outer table join, in a hash loops procedure when a size of a build table of the hash loops procedure exceeds a main memory size, the method comprising:

reversing the roles of the build table and probe table;

executing a hash loops join of the build table and probe table; and flagging rows of the probe table that match rows of the build table.

2. The method of claim 1, wherein the probe table is established by a preserved table of a left or right outer table join, and rows of the probe table not flagged are joined to one or more fields having NULL values and output.

3. The method of claim 1, wherein the probe table is established by a match once table of an early-out table join, and rows of the probe table joined to respective rows of the build table are flagged ignore, such that rows flagged ignore are not joined to more than one build table row.

4. A computer system, comprising:

at least one computer having at least one main memory defining a main memory size, the computer accessing at least one data storage disk;

one or more input devices associated with the computer for generating a user query for data stored in at least one probe table and at least one build table defining a build table size, the tables being accessible by the computer, the computer executing outer join logic means including:

logic means for writing at least portions of a first one of the build or probe tables into the main memory;

logic means for constructing a hash on join columns of rows of the first table;

logic means for reading a second one of the probe or build tables and searching the hash for matches with rows of the first table; and logic means for outputting all rows in the probe table including rows that do not match respective rows in the build table.

5. The computer system of claim 4, wherein the build table is the first table and the probe table is the second table when the build table size is less than the main memory size, and otherwise the probe table is the first table and the build table is the second table when the build table size is greater than the main memory size, the probe table being established by a preserved table in a hash loops join.

6. The computer system of claim 5, wherein the means for outputting includes:

match means for joining a match row in the probe table with a match row in the build table to establish a joined row and outputting the joined row when the match rows satisfy a join predicate; and null means for joining an unmatched row in the probe table with one or more NULL field values when the unmatched row does not match any row in the build table.

7. The computer system of claim 6, further comprising:

means for flagging matched probe table rows as matched, wherein the null means undertakes its function by determining that a row in the second table has not been flagged as matched.

8. A computer-implemented method, comprising:

executing a hash loops join of a build table and a probe table;

outputting at least portions of at least one matched row in the probe table with at least portions of at least one corresponding row in the build table when the rows match each other; and outputting unmatched rows in the probe table, the unmatched rows not matching any rows of the build table.

9. The method of claim 8, wherein the unmatched rows are joined to one or more NULL values prior to outputting the unmatched rows.

10. The method of claim 9, further comprising:

writing at least portions of a first one of the build or probe tables into a computer main memory;

constructing a hash on join columns of rows of the first table; and reading a second one of the probe or build tables and searching the hash for matches with rows of the first table, wherein the build table is the first table and the probe table is the second table when a build table size is less than a main memory size, and otherwise the probe table is the first table and the build table is the second table when the build table size is greater than the main memory size.

11. The method of claim 10, further comprising:

flagging matched probe table rows as matched; and determining that a row in the second table has not been flagged as matched.

12. A computer program device comprising:

a computer program storage device readable by a digital processing apparatus; and a program means on the program storage device and including instructions executable by the digital processing apparatus for performing method steps for joining a probe table to a build table in a probe phase in response to a database query for information, the method steps comprising:

executing a hash loops join of the build table and the probe table;

outputting at least portions of at least one matched row in the probe table with at least portions of at least one corresponding row in a build table when the rows satisfy a join predicate; and outputting unmatched rows in the probe table, the unmatched rows not matching any rows of the build table.

13. The computer program device of claim 12, wherein the method steps further include joining unmatched rows to one or more NULL field values prior to outputting the unmatched rows.

14. The computer program device of claim 13, wherein the method steps further comprise:

writing at least portions of a first one of the tables into a computer main memory;

constructing a hash on join columns of rows of the first table; and reading a second one of the tables and searching the hash for matches with rows of the first table, wherein the build table is the first table and the probe table is the second table when a build table size is less than a main memory size, and otherwise the probe table is the first table and the build table is the second table when the build table size is greater than the main memory size.

15. The computer program device of claim 14, wherein the method steps further comprise:

flagging matched probe table rows as matched; and determining that a row in the second table has not been flagged as matched.

16. A computer-implemented method, comprising:

executing a hash loops join of a build table and a probe table;

outputting at least portions of at least one match row in the probe table with at least portions of at most one corresponding row in the build table when the rows match each other.

17. The method of claim 16, further comprising:

writing at least portions of a first one of the tables into the main memory;

constructing a hash on join columns of rows of the first table;

reading a second one of the tables and searching the hash for matches with rows of the first table; and joining the match row in the probe table to a row in the build table when the rows satisfy a join predicate and not joining the match row to any other rows in the build table regardless of whether the matched row matches any other rows in the build table.

18. The method of claim 17, wherein the probe table is a match once table in an early-out join.

19. The method of claim 18, further comprising:

flagging probe table rows as ignore once the rows are found to match a row in the build table.

20. A computer program device, comprising:

a computer program storage device readable by a digital processing apparatus; and a program means on the program storage device and including instructions executable by the digital processing apparatus for performing method steps for joining a probe table to a build table in a probe phase in response to a database query for information, the method steps comprising:

executing a hash loops join of the build table and the probe table;

outputting at least portions of at least one match row in the probe table with at least portions of at most one corresponding row in the build table when the rows match each other, such that the joining of the match row to any other rows in the build table is prevented regardless of whether the match row matches a row in the build table.

21. The computer program device of claim 20, wherein the method steps further comprise:

writing at least portions of a first one of the tables into the main memory;

constructing a hash on join columns of rows of the first table;

reading a second one of the tables and searching the hash for matches with rows of the first table; and joining the match row in the probe table to a row in the build table when the rows match and not joining the match row to any other rows in the build table regardless of whether the matched row matches any other rows in the build table.

22. The computer program device of claim 21, wherein the probe table is a match once table in an early-out join.

23. The computer program device of claim 22, wherein the build table is the first table and the probe table is the second table when the build table size is less than a main memory size, and otherwise the probe table is the first table and the build table is the second table when the build table size is greater than the main memory size.

24. The computer program device of claim 23, wherein the method steps further comprise:

flagging probe table rows as ignore once the rows are found to match a row in the build table.

\* \* \* \* \*